United States Patent
Cundiff

[19]

[11] Patent Number: 6,156,146
[45] Date of Patent: Dec. 5, 2000

[54] RESIN TRANSFER MOLDING WITH HONEYCOMB CORE AND CORE FILLER

[75] Inventor: Thomas R. Cundiff, Puyallup, Wash.

[73] Assignee: The Boeing Company, Seattle, Wash.

[21] Appl. No.: 08/730,345

[22] Filed: Oct. 15, 1996

Related U.S. Application Data

[62] Division of application No. 08/368,063, Jan. 3, 1995, Pat. No. 5,569,508.

[51] Int. Cl.$^7$ ...................................................... B65C 1/00
[52] U.S. Cl. ..................... 156/213; 156/228; 156/242; 156/245; 156/272.2; 156/275.5
[58] Field of Search .................................. 156/213, 228, 156/242, 245, 272.2, 275.5

[56] References Cited

U.S. PATENT DOCUMENTS

| | | | |
|---|---|---|---|
| 2,227,212 | 12/1940 | Beck | 428/236 |
| 2,745,779 | 5/1956 | Ritter et al. | 428/140 |
| 2,839,442 | 6/1958 | Whitaker | 156/213 |
| 3,655,818 | 4/1972 | McKown | 428/117 |
| 3,857,217 | 12/1974 | Reps | 52/582.1 |

(List continued on next page.)

FOREIGN PATENT DOCUMENTS

| | | |
|---|---|---|
| 3720371 | 1/1989 | Germany . |
| 4200572 | 7/1993 | Germany . |
| 2059027 | 3/1987 | Japan . |
| 62-240516 | 10/1987 | Japan . |
| 171935 | 7/1989 | Japan . |

OTHER PUBLICATIONS

Kirk–Othmer, Enecyclopedia of Chemical Technology, Fourth Edition, 1993, vol. 7, pp. 1, 18, 27 and 28.

Material Safety Data Sheet, 3M PR 500 Molding Resin, issued Apr. 26, 1992, 3M General Offices, St. Paul, Minnesota, pp. 1–4.

Chemical Handling Requirements, 3M PR 500 Molding Resin, Document No. A–1330–CHR–0538, dated Jul. 21, 1992 (one page).

Boeing Material Specification, BMS 8–245K, Adhesive for Composite Bonding (350° F Cure), revised Sep. 29, 1994, pp. 1–17.

Boeing Material Specification, BMS 8–245K, Qualified Products List, Sep. 29, 1994, pp. 1–2.

Material Safety Data Sheet, Dexter Aerospace, SYNSPAND X98993, printed Jun. 24, 1994, pp. 1–5.

A.W. Alteneder et al., Processing and Characterization Study of Honeycomb Composite Structures, Proceedings 38th International SAMPE Symposium and Exhibition, May 10–13, 1993, Anaheim, California.

Primary Examiner—Timothy M. Speer
Attorney, Agent, or Firm—Paul C. Cullom, Jr.

[57] ABSTRACT

A process for making a layered product having a honeycomb core having cells filled with a foam material, the process comprising the steps of: (a) placing a first layer of an uncured, heat-expandable, foamable material on the top side of a central honeycomb core having empty cells, and placing a second layer of an uncured, heat-expandable, foamable material on the bottom side of the central honeycomb core; (b) placing a first layer of an uncured preform material above the first layer of uncured, heat-expandable, foamable material, and placing a second layer of an uncured preform material above the second layer of uncured, heat-expandable, foamable material; (c) placing the charge made by steps (a) and (b) inside a mold and closing the mold; (d) heating the mold to the cure temperature of the heat-expandable, foamable material, and holding the mold at this temperature for sufficient time to expand and cure the heat-expandable, foamable material; (e) reducing the temperature of the mold to the injection temperature of a selected resin transfer molding (RTM) resin system, and injecting the selected resin transfer molding (RTM) resin system into the mold; (f) holding the temperature of the mold at the cure temperature for the resin transfer molding (RTM) resin system for sufficient time to cure the resin system; and, (g) removing the product from the mold after curing is completed.

3 Claims, 3 Drawing Sheets

U.S. PATENT DOCUMENTS

| | | | |
|---|---|---|---|
| 4,089,328 | 5/1978 | Doerer et al. | 428/311.1 |
| 4,162,341 | 7/1979 | Norton | 428/117 |
| 4,353,947 | 10/1982 | Northcutt | 428/116 |
| 4,622,091 | 11/1986 | Letterman . | |
| 4,765,942 | 8/1988 | Christensen et al. . | |
| 4,879,152 | 11/1989 | Green . | |
| 5,061,418 | 10/1991 | Ware | 264/466 |
| 5,135,799 | 8/1992 | Gross et al. | 428/117 |
| 5,186,999 | 2/1993 | Brambach | 428/117 |
| 5,234,757 | 8/1993 | Wong | 428/311.1 |
| 5,284,702 | 2/1994 | Umemoto et al. . | |
| 5,338,594 | 8/1994 | Wang et al. | 428/117 |
| 5,445,861 | 8/1995 | Newton et al. . | |

RESIN TRANSFER MOLDING WITH HONEYCOMB CORE AND CORE FILLER

CROSS-REFERENCE TO ANOTHER APPLICATION

This is a divisional of application Ser. No. 08/368,063 filed on Jan. 3, 1995 now U.S. Pat. No. 5,569,508.

This is a cross-reference to co-pending U.S. patent application Ser. No. 08/368,062, filed by U.S. Express Mail No. GB370067027US, filed on Jan. 3, 1995 (the same date as the parent of this application), now U.S. Pat. No. 5,567,499 entitled "Resin Transfer Molding In Combination With Honeycomb Core," invented by Thomas R. Cundiff and Bradley A. Frye, commonly-assigned to The Boeing Company, and having Attorney Docket No. 92-275. The aforesaid patent application of Thomas R. Cundiff and Bradley A. Frye is hereby incorporated by reference in this application.

BACKGROUND OF THE INVENTION

1) Field of the Invention

This invention relates to a process of resin transfer molding (RTM) used in combination with honeycomb core material and a heat-expandable, foamable material which is heated and expanded to fill the cells of the honeycomb core material. This invention also relates to the strong, lightweight products made thereby. More particularly, the process is for making products through the use of resin transfer molding (RTM) wherein the final product includes a unit of honeycomb core material having cells filled with a foam material (i.e., the RTM resin has been excluded from the cells of the honeycomb core). The strong, lightweight products made by this process are useful in many applications, for example, as aircraft parts.

2) Description of the Background Art

Resin transfer molding (RTM) allows the economical manufacture of high quality composites. Dry fibers, which may have the form of continuous strand mat, unidirectional, woven or knitted preforms, are placed in a closed mold and resin is then introduced into the mold under external pressure or vacuum. The resin cures under the action of its own exotherm, or heat may be applied to the mold to complete the curing process. Early applications of the resin transfer molding technique employed unsaturated polyester resins. Polyester and vinyl ester resins are used in resin-transfer-molded consumer products, pipes, pressure vessels, and automotive applications. Epoxy resins have also been developed for resin transfer molding of high quality, high fiber volume fraction composite components in electronic and aerospace applications.

Resin transfer molding is a process where the resin system is transferred at low viscosities and low pressures into a closed mold die containing a preform of dry fibers. The RTM process can be used to produce low cost composite parts that are complex in shape. These parts typically require continuous fiber reinforcement along with inside mold line and outside mold line controlled surfaces. It is the placement of continuous fiber reinforcements in large structures that sets RTM apart from other liquid molding processes.

For five decades, resin transfer molding has been used for applications suitable to consumer product markets. However, in the last decade through the development of high-strength resin systems and more advanced pumping systems, RTM has advanced to new levels. These recent developments have promoted this technology as a practical manufacturing option for high-strength composite designs, particularly in the aerospace industry.

The following are some of the fundamental advantages of the resin transfer molding process: (1) complex shapes (detail integration); (2) low part variability (product of the mold); (3) good surface finish; (4) 55 to 70% by weight fiber/resin ratio control; (5) eliminates autoclave cycle; (6) low material costs; (7) minimal training costs; (8) low capital investment costs; (9) low worker exposure; and, (10) bushings and inserts can be molded in.

In the aerospace industry, the most visible advantage to this molding process lies in its ability to make complex shapes, that is, to combine multiple, detailed components into one configuration. For example, many traditional designs consist of many individual details that are combined as a subassembly. These subassemblies usually require labor-intensive shimming, bonding, mechanical fastening, and sealing. Consequently, these subassemblies demonstrate high part-to-part variability due to tolerance buildup.

Individual components are integrated into one item with resin transfer molding. Therefore, the part-to-part variation is low because the parts are a product of the mold.

Aerodynamic, decorative finish and controlled fit-up surfaces are typical part characteristics in the aerospace industry. These high-quality surface-finish characteristics are ideal for RTM. Therefore, being a product of the mold makes the surface quality of the part comparable to that of the tool's surface.

Another advantage of RTM is the control of the reinforcement/resin ratio, which is typically 55 to 70% fiber by weight. This produces parts that are lightweight and high in strength.

Because the method of heat transfer is integrated into the mold die, the need for an autoclave is eliminated. Therefore, no autoclave costs are incurred, no size limitations are inherent, and no staging issues occur.

In terms of raw material costs, RTM offers cost savings by using bulk materials like broad goods. Because dry goods are less expensive than preimpregnated materials, a savings can be associated with the cost of the wasted material during the ply-knitting operation. Also, bulk materials do not need special handling requirements such as freezer storage.

The basic injection operation of RTM is straight-forward and easily learned. Hence, minimal training is required to bring operators on line. On the other hand, in making preforms the level of operator skill and training is dependent on the method of preforming that is used.

The initial capital investment costs of RTM are low when compared with the many other molding processes. The most elementary approach to RTM can be achieved using a pressure pot, an oven, and a vacuum source. A variety of commercially-available equipment can be used to advance the process in many areas.

In most cases, RTM materials can be used with minimal chemical exposure to workers and their environment. Many high-performance resin systems are stable and release low volatiles. Since RTM is processed within a closed system, workers are exposed to the resin only when loading the dispensing equipment.

Bushings and inserts can be incorporated into the preform and injected in-place to eliminate some higher level assembly. Special considerations, however, must be made in the design and fabrication of the mold die (i.e., value added vs. tool cost).

Some of the limitations of RTM include: (1) higher tool cost; (2) design changes can be costly (tooling costs); (3)

cost of advanced preforming architecture; (4) cost of custom resin systems; and, (5) tool handling challenges (size and weight of tools).

Due to the high quality of the mold and inherent complexity, tooling is expensive. Parts with complex configurations have costly multi-piece, break-down tooling.

Design changes can be costly when modifying complex multi-piece molds. Even a simple design change can result in extensive rework or tool remake.

The cost of advance preforming architecture can be high due to slow labor-intensive processes.

The resin systems must meet design and process parameters that may be difficult to combine. For example, design criteria such as mechanical test values or flammability values must coincide with the process criteria such as pot life, viscosity, worker exposure, and cure time. Resin tougheners, in general, cannot be added because the preform acts as a prime filter entrapping these materials at the point of induction.

One of the benefits of RTM is the ability to manufacture large parts. However, it can also be a major limitation because the tools are large and heavy. Large and massive molds have special handling needs that can include cranes, trunnions, and fork lifts.

The special problem involved in using resin transfer molding to make products that include a unit of honeycomb core material is the exclusion of the resin from the cells of the honeycomb core material. If the honeycomb core cells are not isolated from the resin being injected into the mold, the cells of the honeycomb core will fill with resin and a very heavy product will be the result.

SUMMARY OF THE INVENTION

The present invention solves the foregoing problem and provides a means of making strong, lightweight products that include units of honeycomb core material having cells filled with a foam material (i.e., the RTM resin has been excluded from the cells of the honeycomb core). The cells of the honeycomb core material are isolated from the RTM resin by the foam material. The foam material provides a barrier to the RTM resin system so that when the resin system is injected into the mold the resin system is excluded from the cells of the honeycomb core material.

In one aspect, the present invention is a layered product made in a mold and having a honeycomb core having cells filled with a foam material, the product having: (a) a central honeycomb core having cells filled with a foam material, the foam material having been cured inside the mold; and, (b) a first layer of a cured preform impregnated with a resin transfer molding (RTM) resin system above the central honeycomb core, and a second layer of a cured preform impregnated with a resin transfer molding (RTM) resin system below the central honeycomb core, the first and second layers of preform impregnated with a resin transfer molding (RTM) resin system having been cured inside the mold.

In another aspect, the present invention is a process for making a layered product having a honeycomb core having cells filled with a foam material, the process comprising the steps of: (a) placing a first layer of an uncured, heat-expandable, foamable material on the top side of a central honeycomb core having empty cells, and placing a second layer of an uncured, heat-expandable, foamable material on the bottom side of the central honeycomb core; (b) placing a first layer of an uncured preform material above the first layer of uncured, heat-expandable, foamable material, and placing a second layer of an uncured preform material above the second layer of uncured, heat-expandable, foamable material; (c) placing the charge made by steps (a) and (b) inside a mold and closing the mold; (d) heating the mold to the cure temperature of the heat-expandable, foamable material, and holding the mold at this temperature for sufficient time to expand and cure the heat-expandable, foamable material; (e) reducing the temperature of the mold to the injection temperature of a selected resin transfer molding (RTM) resin system, and injecting the selected resin transfer molding (RTM) resin system into the mold; (f) holding the temperature of the mold at the cure temperature for the resin transfer molding (RTM) resin system for sufficient time to cure the resin system; and, (g) removing the product from the mold after curing is completed.

In yet another aspect, the invention is a layered aircraft part made in a mold and having a honeycomb core having cells filled with a foam material, the aircraft part having: (a) a central honeycomb core having cells filled with a foam material, the foam material having been cured inside the mold; and, (b) a first layer of a cured preform impregnated with a resin transfer molding (RTM) resin system above the central honeycomb core, and a second layer of a cured preform impregnated with a resin transfer molding (RTM) resin system below the central honeycomb core, the first and second layers of preform impregnated with a resin transfer molding (RTM) resin system having been cured inside the mold.

Finally, in yet another aspect, the invention is a process for making a layered aircraft part having a honeycomb core having cells filled with a foam material, the process comprising the steps of: (a) placing a layer of an uncured, heat-expandable, foamable material on the top side of a central honeycomb core having empty cells, and placing a second layer of an uncured, heat-expandable, foamable material on the bottom side of the central honeycomb core; (b) placing a first layer of an uncured preform material above the first layer of uncured, heat-expandable, foamable material, and placing a second layer of an uncured preform material above the second layer of uncured, heat-expandable, foamable material; (c) placing the charge made by steps (a) and (b) inside a mold and closing the mold; (d) heating the mold to the cure temperature of the heat-expandable, foamable material, and holding the mold at this temperature for sufficient time to expand and cure the heat-expandable, foamable material; (e) reducing the temperature of the mold to the injection temperature of a selected resin transfer molding (RTM) resin system, and injecting the selected resin transfer molding (RTM) resin system into the mold; (f) holding the temperature of the mold at the cure temperature for the resin transfer molding (RTM) resin system for sufficient time to cure the resin system; and, (g) removing the part from the mold after curing is completed.

BRIEF DESCRIPTION OF THE DRAWINGS

For a better understanding of the invention, and to show how the same may be carried into effect, reference will now be made, by way of example, to the accompanying drawings. In the different figures, elements designated by like reference numerals have corresponding functions.

DESCRIPTION OF THE PREFERRED EMBODIMENTS

Figure 1:
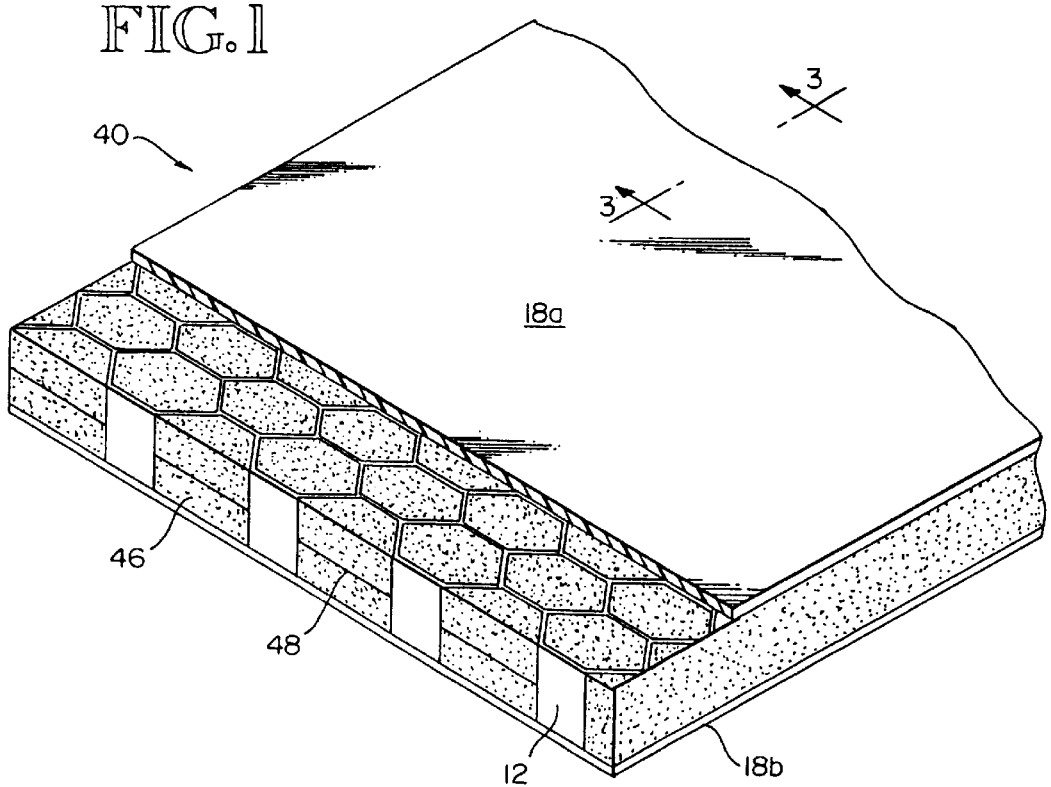
FIG. 1 is a schematic perspective view, partially in cutaway, of the final cured product of the invention showing the layers above and below the central honeycomb core material and showing the cells of the honeycomb core material filled with a cured foam material.

To design and fabricate parts using the RTM process, one must evaluate the part requirements based on the following: (1) the part requires high-strength, continuous-fiber reinforcement with 55 to 75% fiber by weight; (2) the part is complex in nature with designed-in flanges, stiffeners, or inserts; (3) the part tolerance requirements typically range from ±0.10 to ±0.30; (4) the part thickness ranges from 0.040 inch up to 5.0 inches; and, (5) the surface finish of the part must be 125 RMS or better (well within typical machining parameters).

Some of the most common materials used to fabricate dry fiber preforms are fiberglass, graphite, aramid, and ceramics. These fiber materials can be used separately or combined into a variety of hybrids to meet specific performance needs. Since these materials have been used in composite manufacturing for many years, they offer enhanced design flexibility. There are several ways to form the reinforcements to a desired shape. Different preform styles include braiding, knitting, weaving, filament winding, and stitching. Each of these styles is inherently unique and must be individually evaluated for specific design characteristics. Woven and filament wound preforms typically require a binding agent to maintain consolidation and configuration. Binding agents work best if they are a derivative of the neat resin system. In some situations, it is necessary to use a binder that is dissimilar. If this is the case, the binder can migrate, consolidating during injection in an uncontrolled manner, and reducing the strength of the base resin system.

All dry fiber preforms should be consolidated prior to loading the mold. Consolidated preforms ensure appropriate fiber orientation and volume. Fiber orientation and distortion in the RTM process must be understood from two aspects. The first deals with the positioning, forming, and consolidating of dry fibers. Unlike preimpregnated reinforcements, dry fibers are unstable and are easily distorted. Binders help to stabilize the fibers during their handling and positioning. During the forming and consolidation process, the preform becomes stable. Once the preform is consolidated, it can be handled, assembled, and located in the mold with limited distortion. The second aspect deals with the ability to hold and lock the correct fiber orientation during resin injection. When the preform is closed in the mold, it is further consolidated by the closing pressure. The preform's high fiber content locks the fibers tightly in place, preventing fiber movement.

The quality of the mold is most critical to the RTM process. The surface finish and dimensional control are in the products of the mold. In other words, the time and money spent to make high quality molds will yield high quality parts.

When selecting an RTM resin system for design, the first step is to clearly define the performance conditions. Some of the performance criteria includes the range of operating temperatures, thermal cycles, and mechanical properties. To ensure the proper resin selection, the resin properties must be evaluated based on the performance conditions. A wide variety of RTM resin systems is available for use in the present invention, along with many others that are in the development stage. Some of the generic RTM resin systems that can be used include: epoxy resin systems; cyanate ester resin systems; vinyl ester resin systems, phenolic resin systems, polyester resin systems, and bismaleimide resin systems.

The list of resin characteristics serves as the base to define the resin transfer process parameters. Resins that are conducive to the RTM process demonstrate low viscosity (ideally 500 cps or less), extended pot life, low volatile content, and low exothermic temperatures with a semi-rapid gel time.

RTM resin systems are available in different formulations such as one-part or two-part systems. Cleanup operations of non-cross-linked formulations require solvents. Therefore, solvent cleanup should be considered when selecting an RTM resin system, although appropriate pumping equipment can store, load, and pump many of these resin systems directly from their shipping containers and require minimal solvent cleanup. Solvents are discouraged because they increase both worker exposure and hazardous waste disposal.

There are several types of RTM resin delivery systems available on the commercial market that can be employed in the present invention. The pump mechanism can be powered with one or a combination of pneumatic, hydraulic, or gear drive systems. The resin injection operation is key to successfully carrying out the process. Better results have been experienced using positive displacement pumps. A positive displacement pump is preferred when the configuration of the part is large or complex. This type of pump provides constant pressure and continuous resin flow. At the same time, these systems provide the means to control and optimize the injection cycle.

The most elementary pumping system is a pneumatic pressure pot. This type of system has produced many successful parts with RTM. However, it is limited by the degree of control over the rate and pressures of the resin flow front. On the other hand, advanced resin delivery systems provide positive displacement combined with computer control features controlling critical variables of the resin injection operation that are otherwise operator sensitive.

The type of resin being used is important when selecting a resin delivery system. Many of the delivery systems offer an array of options that the user must evaluate. For example, the generic differences between a two-part and a one-part resin system can illustrate this. A two-part resin involves a pump with features that offer metering, mixing, and delivering. A one-part system does not require mixing, so the pump is used for delivery only.

Many resin delivery systems offer enhanced features that improve the process such as an ability both to maintain a predetermined hydrostatic resin pressure and to adjust and display the temperature for viscosity control as well as for resin flow rate and volume control. These systems are generally simple to set up and operate, and are easy to clean and maintain.

Because there are many variables that influence the RTM process, the following are some preferred guidelines to the RTM process: (1) fiber loading for structural applications at 55–65% by weight; (2) hard vacuum assistance provides better resin flow for complete ply wet out; (3) resin viscosity less than 500 cps allows lower injection pressure; (4) preconsolidated preform is complete, ready for mold loading; (5) mold is integrally heated to reduce cycle time and mold handling; (6) resin is previously degassed to minimize porosity and void content; (7) hydrostatic pressure is held after resin injection to lower porosity content; and, (8) injection pressure is less than 100 psi to allow a slow-moving flow front with minimal fiber distortion.

The problem involved in using resin transfer molding to make products that include a unit of honeycomb core material is the exclusion of the RTM resin from the cells of the honeycomb core material. The present invention solves this problem and provides a process for making strong, lightweight products that include units of honeycomb core material having cells filled with a cured foam material (i.e., the RTM resin has been excluded from the cells of the honeycomb core). The cells of the honeycomb core material are isolated on both sides by the cured foam material. The cured foam material provides a barrier for the cells of the honeycomb core material prior to injection of the RTM resin system so that the resin system is excluded from the cells of the honeycomb core material.

The Product Of The Invention

Figure 3:
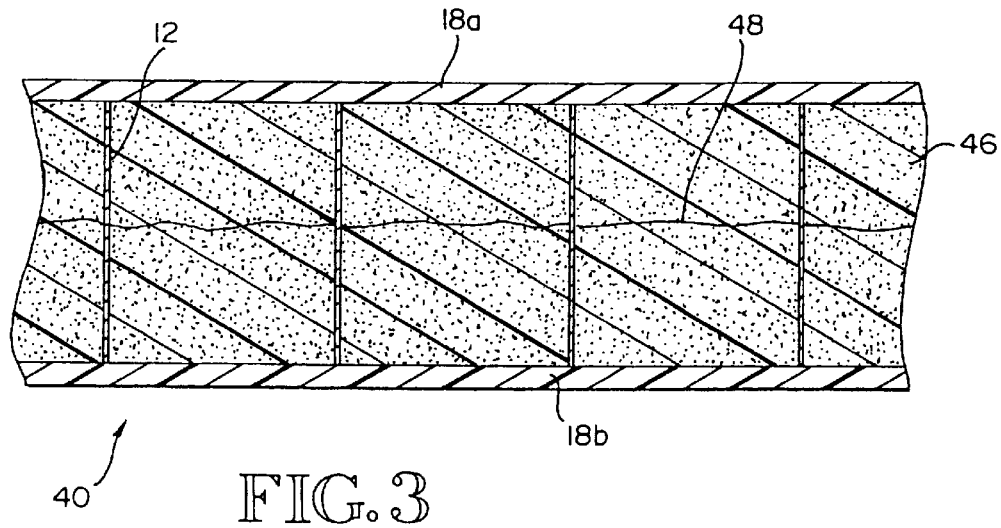
FIG. 3 is a schematic vertical sectional view, taken along line 3—3 of FIG. 1, of the final cured product of the invention showing the layers above and below the central honeycomb core material and showing the cells of the honeycomb core material filled with a cured foam material.

Referring to the drawings, FIGS. 1 and 3 show schematically the layered construction of the final product 40 of the invention. The final product 40 is constructed of a central honeycomb core material 12 having cells filled with a cured foam material 46 (i.e., the RTM resin has been excluded from the cells of the honeycomb core 12) and cured layers 18a, 18b (shown schematically) comprised of the preform fibers which have been impregnated with the RTM resin system and cured inside the mold 22 (FIG. 4).

Figure 2:
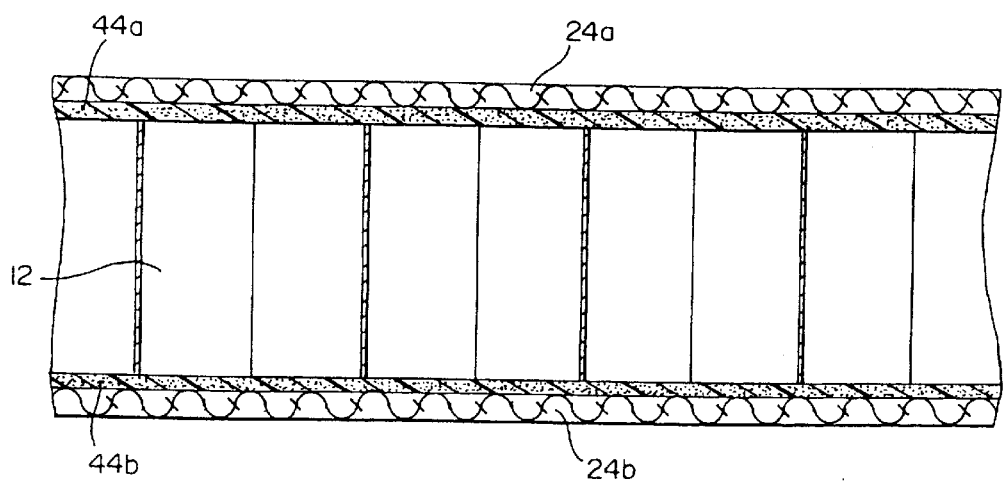
FIG. 2 is a schematic vertical sectional view of the uncured lay-up of the product of the invention showing the layers above and below the central honeycomb core material and showing (at this point in the process) the empty cells of the honeycomb core material.

FIG. 2 shows schematically the layered construction of the uncured lay-up of the product of the invention showing the central honeycomb core material 12 Having empty cells (at this point in the process before the heat-expandable, foamable material 44a, 44b has been heated and expanded); the layers of an uncured heat-expandable, foamable material 44a, 44b; and the layers of a preform 24a, 24b of dry fibers (before the RTM resin system has been injected into the mold).

Figure 4:
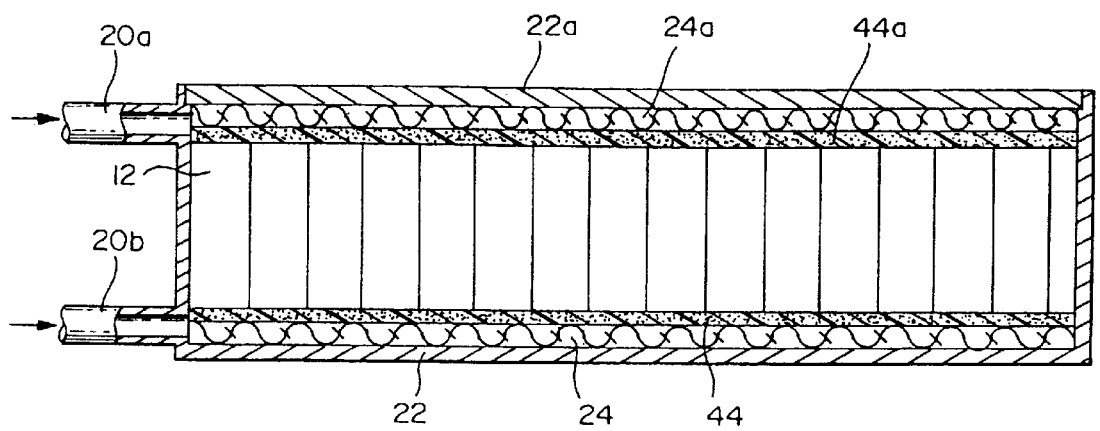
FIG. 4 is a schematic vertical sectional view of the die mold used in resin transfer molding (RTM) to make the final cured product of the invention shown in FIGS. 1 and 3.

FIG. 4 shows schematically a typical RTM heated die mold 22 having a lid 22a and having upper and lower inlet ports 20a and 20b where the RTM resin system is injected into the closed mold. The charge inside mold 22 is constructed of the central honeycomb core material 12 having empty cells (at this point in the process before the heat-expandable, foamable material 44a, 44b has been heated and expanded); layers of an uncured heat-expandable, foamable material 44a, 44b; and layers of a preform 24a, 24b of dry fibers (before the RTM resin system has been injected into the mold).

The honeycomb core material can be any of the honeycomb core materials such as: aluminum, aluminum alloy, fiberglass, NOMEX, and carbon composite. The preform dry fibers can be any of the fibers described above such as: fiberglass, carbon (graphite), aramid, and ceramics. The prepreg material can be any of the prepreg materials. The primary requirement is that the cure temperature of the prepreg material should be the same as the cure temperature of the adhesive film. The RTM resin system can be any of the conventional RTM resin systems described above such as: epoxy resin systems; cyanate ester resin systems; vinyl ester resin systems, phenolic resin systems, polyester resin systems, and bismaleimide resin systems.

The preferred material that may be employed as the heat-expandable, foamable material 44a, 44b (FIGS. 2 and 4) is SYNSPAND X9899. The uncured preferred material is described as follows:

Supplier: Dexter Aerospace, Materials Division; Pittsburg, Calif.

Product Designation:

SYNSPAND X9899

Composition: Component (1)—Adhesive mixture containing bisphenol A/epichlorohydrin epoxy resin 30–60% by wt.; and Component (2)—Inert carriers 30–60% by wt.

The Process Of The Invention

The process of the invention is as follows. The first two steps of building up the charge (or sandwich) can be accomplished inside the mold 22 (FIG. 4) before it is closed or the steps can be accomplished outside the mold.

The first step is to place a layer of the uncured heat-expandable, foamable material 44a, 44b on the top, bottom, and vertical sides of the honeycomb core material 12 (which at this time has empty cells).

The second step is to place the layers 24a, 24b of dry fiber preform over the top layer 44a of the uncured heat-expandable, foamable material and under the bottom layer of the uncured heat-expandable foamable material 44b. This completes the charge.

The third step is to place the charge inside the mold 22 and to close the mold.

The fourth step is to heat the mold to the cure temperature of the heat-expandable, foamable material 44a, 44b and to hold the mold at this temperature for sufficient time to expand and cure the heat-expandable, foamable material. The cure temperature can vary depending on the specific heat-expandable, foamable material being employed. For example, for SYNSPAND X9899, the cure temperature is about 350° F. The cure time can vary depending on the specific foamable material being employed. For example, for SYNSPAND X9899, the cure time is about 90 minutes. At this point in the process, there is no pressure added inside the mold beyond the mechanical pressure of the closed mold pressing against the charge and consolidating the charge. During the cure, the heat-expandable, foamable material changes its physical state to a foam that expands and fills the cells of the honeycomb core. The net effect is that the layer of heat-expandable, foamable material transforms entirely into a foam. The upper layer 44a of heat-expandable, foamable material generates a foam that expands downwardly into the cells of the honeycomb core below it. The lower layer 44b of heat-expandable, foamable material generates a foam that expands upwardly into the cells of the honeycomb core above it. The two advancing fronts of foam meet near the mid-plane of each of the cells, thereby creating a boundary line 48 (FIGS. 1 and 3) in each cell where the advancing fronts of foam met. The density of the resulting cured foam is in the range of 10–40 lbs/ft$^3$. A low density cured foam is preferred for aircraft parts where low weight is the goal. The layers 24a, 24b of dry fiber preform (FIGS. 2 and 3) are not impregnated by the foam during the foregoing expansion and cure of the layers of heat-expandable, foamable material.

The fifth step is to reduce the temperature of the mold 22 to the RTM resin system injection temperature and to inject the RTM resin system into the mold through the inlet ports 20a, 20b. The cured foam 46 will not allow the RTM resin into the cells of the honeycomb core 12. The RTM resin system injection temperature can range from 250° F. to 350° F. depending on the specific RTM resin system being employed. An example of a one-part epoxy RTM resin system is the product PR 500 made by 3M Company, Aerospace Materials Department, St. Paul, Minn., which has a built-in curing catalyst that is activated at the cure temperature of about 320° F. At this point in the process, after the mold is full of RTM resin, a hydrostatic pressure may be applied to fill any voids that have not been filled by the resin. The pressure is applied through the pumping system. For example, the pressure applied by the pumping system may be in the range of 20–60 psi.

The seventh step is to increase (if necessary) the temperature of the mold to the cure temperature for the RTM resin system and to hold the mold at this temperature for sufficient time to cure the RTM resin system. Again, the RTM resin system injection temperature can range from 250° F. to 350° F. depending on the specific RTM resin system being employed. After curing is complete, the part is removed from the mold.

An Alternative Embodiment Of The Invention

Figure 5:
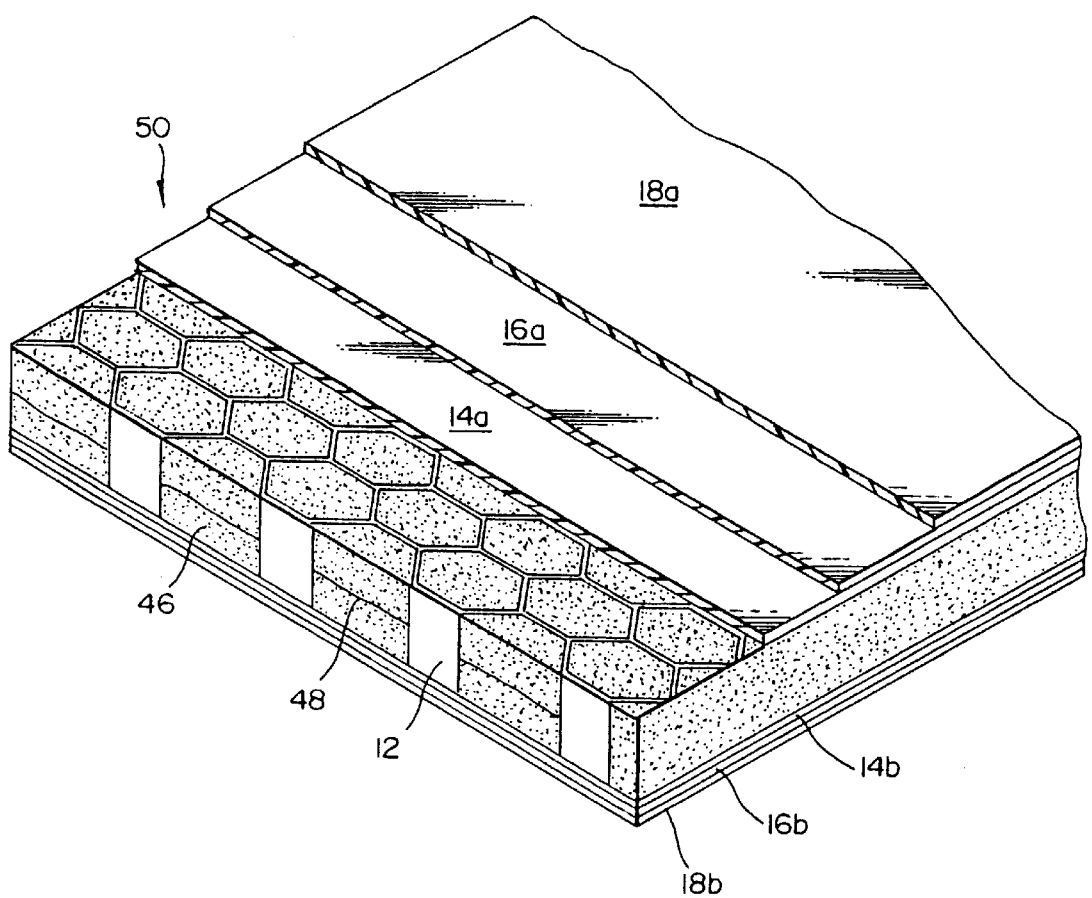
FIG. 5 is a schematic perspective view, partially in cutaway, of an alternative embodiment of the final cured product of the invention showing the layers above and below the central honeycomb core material and showing the cells of the honeycomb core material filled with a cured foam material.

FIG. 5 is a schematic perspective view, partially in cutaway, of an alternative final cured product 50. Reference is made to co-pending U.S. patent application Ser. No. 08/368,062, filed by U.S. Express Mail No. GB370067027US, filed on Jan. 3, 1995 (the same date as the parent of this application), now U.S. Pat. No. 5,567,499 entitled "Resin Transfer Molding In Combination With Honeycomb Core," invented by Thomas R. Cundiff and Bradley A. Frye, commonly-assigned to The Boeing Company, and having Attorney Docket No. 92-275. The aforesaid patent application of Thomas R. Cundiff and Bradley A. Frye is hereby incorporated by reference in this application. Final product 50 (FIG. 5) is a combination of the invention of the present application and the invention of the aforesaid patent application of Thomas R. Cundiff and Bradley A. Frye.

Referring to FIG. 5, the alternative final product 50 is constructed of a central honeycomb core material 12 having cells filled with a cured foam material 46 (i.e., the RTM resin has been excluded from the cells of the honeycomb core 12); layers of a cured adhesive film 14a, 14b which have been cured inside the mold; layers of a cured prepreg material 16a, 16b which have been cured inside the mold, and cured layers 18a, 18b (shown schematically) comprised of the preform fibers which have been impregnated with the RTM resin system and cured inside the mold.

The process of making the alternative final product 50 is a combination of the process described in the present application and the process described in the aforesaid patent application of Thomas R. Cundiff and Bradley A. Frye. The process is as follows. The first three steps of building up the charge (or sandwich) can be accomplished inside the mold before it is closed or the steps can be accomplished outside the mold.

The first step is to place a layer of the uncured heat-expandable, foamable material on the top, bottom, and vertical sides of the honeycomb core material 12 (which at this time has empty cells).

The second step is to place a layer of the adhesive film 14a, 14b on the top side and bottom side of the honeycomb core material 12.

The third step is to place a layer of the prepreg material 16a, 16b over each layer of the adhesive film 14a, 14b.

The fourth step is to place the dry fiber preform 24a, 24b over each layer of the prepreg material 16a, 16b. This completes the charge.

The fifth step is to place the charge inside the mold 22 and to close the mold.

The sixth step is to heat the mold to the cure temperature of the heat-expandable, foamable material, the adhesive film 14a, 14b, and the prepreg material 16a, 16b and to hold the mold at this temperature for sufficient time to expand and cure the heat-expandable, foamable material, to cure the adhesive film, and to cure the prepreg.

The seventh step is to reduce the temperature of the mold to the RTM resin system injection temperature and to inject the RTM resin system into the mold through the inlet ports. At this point in the process, after the mold is full of resin, a hydrostatic pressure may be applied to fill any voids that have not be filled by the resin. The pressure is applied through the pumping system. For example, the pressure applied by the pumping system may be in the range of 20–60 psi.

The eighth step is to increase (if necessary) the temperature of the mold to the cure temperature for the RTM resin system and to hold the mold at this temperature for sufficient time to cure the RTM resin system. After curing is complete, the part is removed from the mold.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process for making a layered product having a honeycomb core having cells filled with a foam material, said process comprising the steps of:

(a) placing a first layer of an uncured heat-expandable foamable material on the top side of a central honeycomb core having empty cells, and placing a second layer of an uncured heat-expandable foamable material on the bottom side of said central honeycomb core;

(b) placing a first layer of an uncured preform material distal to said central honeycomb core and above said first layer of uncured heat-expandable foamable material, and placing a second layer of an uncured preform material distal to said central honeycomb core and below said second layer of uncured heat-expandable foamable material;

(c) placing the charge made by steps (a) and (b) inside a mold and closing the mold;

(d) heating said mold to the cure temperature of said heat-expandable foamable material, and holding said mold at this temperature for sufficient time to expand and cure said heat-expandable foamable material;

(e) reducing the temperature of said mold to the injection temperature of a selected resin transfer molding (RTM) resin system, and injecting said selected resin transfer molding (RTM) resin system into said mold;

(f) holding the temperature of said mold at the cure temperature for said resin transfer molding (RTM) resin system for sufficient time to cure said resin system; and, (g) removing the product from said mold after curing is completed.

2. A process for making a layered aircraft part having a honeycomb core having cells filled with a foam material, said process comprising the steps of:

(a) placing a first layer of an uncured heat-expandable foamable material on the top side of a central honeycomb core having empty cells, and placing a second layer of an uncured heat-expandable foamable material on the bottom side of said central honeycomb core;

(b) placing a first layer of an uncured preform material distal to said central honeycomb core and above said first layer of uncured heat-expandable foamable material, and placing a second layer of an uncured preform material distal to said central honeycomb core and below said second layer of uncured heat-expandable foamable material;

(c) placing the charge made by steps (a) and (b) inside a mold and closing the mold;

(d) heating said mold to the cure temperature of said heat-expandable foamable material, and holding said mold at this temperature for sufficient time to expand and cure said heat-expandable, foamable material;

(e) reducing the temperature of said mold to the injection temperature of a selected resin transfer molding (RTM) resin system, and injecting said selected resin transfer molding (RTM) resin system into said mold;

(f) holding the temperature of said mold at the cure temperature for said resin transfer molding (RTM) resin system for sufficient time to cure said resin system; and, (g) removing the part from said mold after curing is completed.

3. A process for making a layered product having a honeycomb core having cells filled with a foam material, said process comprising the steps of:

(a) placing a first layer of an uncured heat-expandable foamable material on, the top side of a central honeycomb core having empty cells, and placing a second layer of an uncured heat-expandable foamable material on the bottom side of said central honeycomb core;

(b) placing a first layer of an uncured adhesive film above said first layer of uncured heat-expandable foamable material, and placing a second layer of an uncured adhesive film below said second layer of uncured heat-expandable foamable material;

(c) placing a first layer of an uncured prepreg material distal to said central honeycomb core and above said first layer of uncured adhesive film, and placing a second layer of an uncured prepreg material distal to said central honeycomb core and below said second layer of uncured adhesive film;

(d) placing a first layer of a dry fiber preform distal to said central honeycomb core and above said first layer of uncured prepreg material, and placing a second layer of a dry fiber preform distal to said central honeycomb core and below said second layer of uncured prepreg material;

(e) placing the charge made by steps (a)–(d) inside a mold, and closing said mold;

(f) heating said mold to the cure temperature of said heat-expandable foamable material, said adhesive film, and said prepreg material, and holding said mold at this temperature for sufficient time to cure said heat-expandable foamable material, said adhesive film, and said prepreg material;

(g) reducing the temperature of said mold to the injection temperature of a selected resin transfer molding (RTM) resin system, and injecting said selected resin transfer molding (RTM) resin system into said mold;

(h) holding the temperature of said mold at the cure temperature of said resin transfer molding (RTM) resin system for sufficient time to cure said resin system; and, (i) removing said product from said mold after curing is completed.

* * * * *